Dec. 8, 1931.  A. L. WEBRE  1,835,621
VACUUM PAN
Filed May 28, 1930
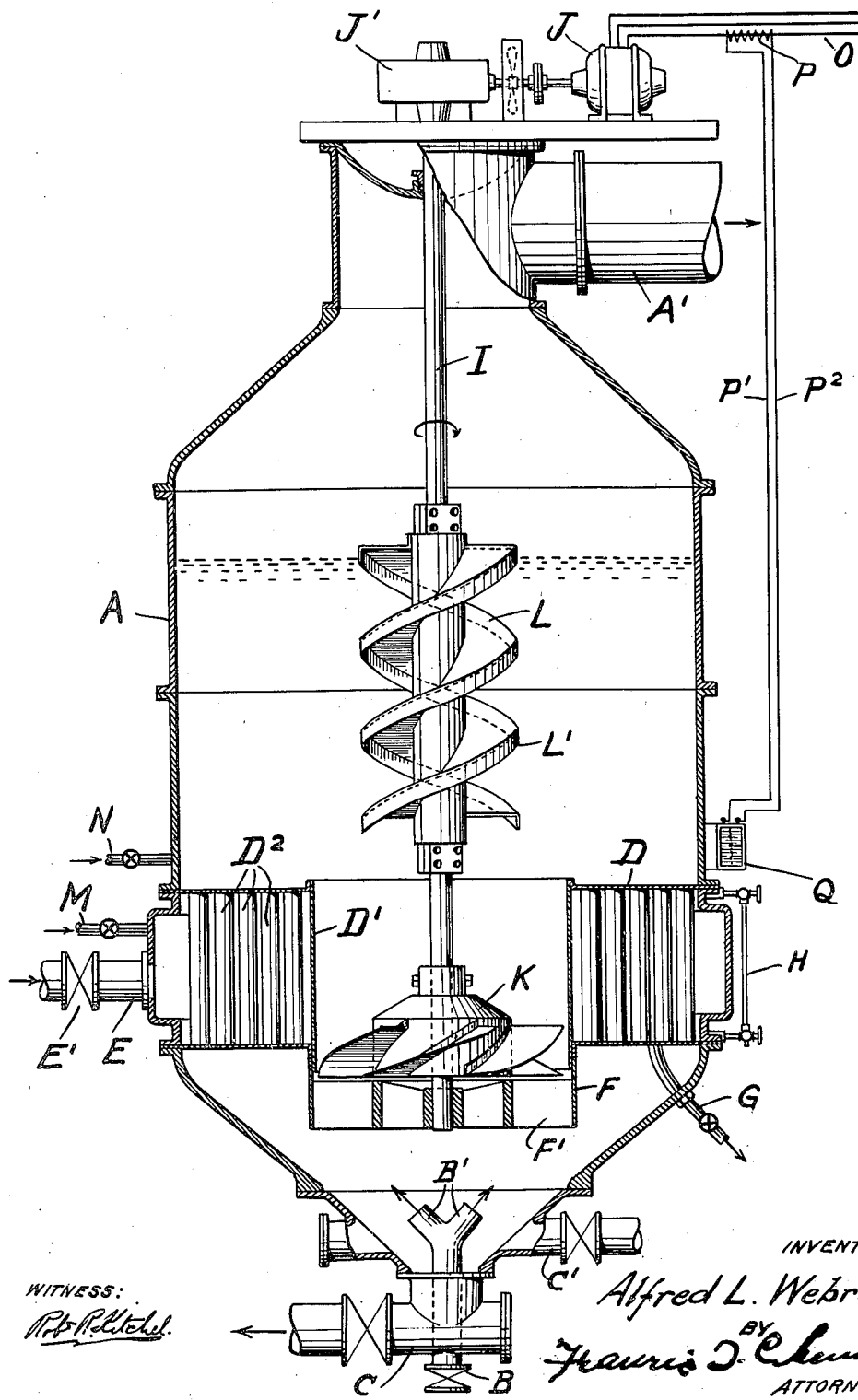
INVENTOR
Alfred L. Webre
BY Francis D. Chambers
ATTORNEY.
WITNESS:

UNITED STATES PATENT OFFICE

ALFRED L. WEBRE, OF MERION, PENNSYLVANIA, ASSIGNOR TO UNITED STATES PIPE & FOUNDRY COMPANY, OF BURLINGTON, NEW JERSEY, A CORPORATION OF NEW JERSEY

VACUUM PAN

Application filed May 28, 1930. Serial No. 456,393.

My invention relates to vacuum pans such as are used in the manufacture of sugar and has for its object to provide a simple and efficient means for visually indicating the condition as to viscosity of the massecuite or solution under treatment in the pan; broadly speaking my invention consists in locating in the pan and in a position therein where it will be submerged by the liquid contents of the pan a rotating impelling device or pump connecting this rotating impelling device with a constant speed motor for actuating it and then connecting an ammeter with a circuit wire connecting a source of electric energy to the motor. By the use of this combination it will be obvious that as the viscosity of the strike in the pan increases more power will be required to maintain it in rotation at constant speed and consequently the constant speed motor will require progressively more current to maintain it in operation and with the increase in current measured by the ammeter connected with one of the circuit wires to measure the current passing through this wire can be relied upon as not only measuring the current consumed but also indicating with considerable accuracy the degree of viscosity of the contents of the pan.

By preference and for the best results I connect the constant speed motor with the screw pump located in the vacuum pan and serving to maintain the liquid contents thereof in a state of circulation through the steam belt.

In the drawing forming part of the specification, which is a vertical section through a vacuum pan provided with my improvement and constructed in what I believe to be its best form, A is the shell of the vacuum pan having a conduit $A^1$ at its top leading to a condenser, not shown.

B is a conduit through which syrup or molasses can be introduced into the vacuum pan. As shown this is supplied with two delivery nozzles $B^1$. The material resulting from the treatment of the syrup in the vacuum pan, generally known as massecuite, can be drawn off through a conduit indicated at C and as shown another conduit $C^1$ is also provided for this purpose. D is a horizontal steam chamber extending inward from the walls of the shell or casing having a large central opening $D^1$ and a multiplicity of relatively small tubes extending through it in an annulus surrounding the central opening as indicated at $D^2$. This steam chamber is supplied with steam or vapor through a conduit indicated at E, having as shown a valve $E^1$ by which the steam or vapor supply can be cut off. The cylinder forming the wall of the central opening is preferably extended below the horizontal steam chamber, as indicated at F. G is a pipe through which water can be drawn from the steam chamber and H is a water glass by which the level of water in the steam chamber is made visible. $F^1 F^1$, etc. indicate vanes secured to the walls of the extension F, which are so shaped as to counteract the swirling action which would be given to the liquid propelled by the pump, to be described. I is a shaft supported in the top of the vacuum pan shell and driven by a constant speed motor J through a reduction gearing indicated at $J^1$. On the lower end of this shaft is secured a screw pump indicated at K and to the upper portion of the shaft is secured a rotary conveying device of such a character that it will act on the upper portion of the contents of the vacuum pan and tend to carry it downward in the direction of the large central opening in the steam chamber; as shown the device provided for this purpose is a screw indicated at L having a downwardly extending flange $L^1$ on its outer edge. M indicates a pipe for supplying water to the steam belt, which is desirable for certain purposes not involved in the subject matter of my present invention, and N is also a water supply pipe entering the vacuum pan, which is provided for the purpose of supplying water for washing the lower portion of the pan and its contents, as is sometimes desirable. O indicates the circuit wires connecting the constant speed motor with a source of electric current. P indicates a winding surrounding one of the circuit wires and connected by circuit wires $P^1 P^2$ with an ammeter indicated at Q.

In operation the vacuum pan is charged with the syrup or other materials ordinarily treated in such apparatus; steam or vapor at proper temperature is turned into the steam belt and the condenser operatively connected with the top of the pan. The shaft I is set in operation at a constant speed of revolution through its connection with the constant speed motor J, rotating the pump K and a conveyor L. It will of course be obvious that the liquid in the pan is engaged and propelled downwards toward the central opening $D^1$ in the steam belt D by the action of the conveyor L and is energetically drawn and forced through the central opening $D^1$ by the action of the pump K. The swirl imparted to the liquid by the pump is counteracted by the vanes $F^1$ and the liquid is forced upward through the tubes $D^2$ of the steam belt with a regulable and known velocity so that the heating effect communicated to the liquid contents of the pump can be nicely regulated.

Rapid motion of the mass in passing through the tubes of the steam belt while insuring a high ratio of heat transference also insures that the mass shall not stay in contact with the heated surfaces for a sufficient length of time to bring about a burning of the sugar and the operation of the apparatus as a whole insures the maintenance of a substantially uniform temperature throughout the body of syrup or massecuite. To the extent above described the apparatus illustrated forms the subject matter of my copending application, Serial Number 456,392, filed May 28, 1930 and, broadly speaking, any other construction involving a screw pump or conveyor located in the fluid contents of the pan and actuated at constant speed by a constant speed motor would serve the purpose of my present invention, which consists in combining with the circuit wires supplying electric current to the constant speed motor impelling the rotary conveyor an ammeter, which, in the combination described, will not only indicate the amount of current consumed by the motor but will also indicate with considerable accuracy the state of viscosity of the liquid contents of the vacuum pan in which the rotary conveyor or impeller is immersed.

Having now described my invention, what I claim as new and desire to secure as Letters Patent, is:

1. In combination with a vacuum pan means for indicating the viscosity of the liquid contents thereof consisting of a rotary device adapted to engage and move the liquid in contact therewith located in the pan at a point where it will be submerged in the liquid contents thereof, a constant speed electric motor to operate said rotary device and an ammeter connected to the motor circuit for measuring the amperage thereof and the viscosity of the liquid.

2. Apparatus as called for in claim 1 in which the rotary device actuated by the constant speed motor is used in combination with a steam belt dividing the pan into upper and lower compartments formed with a central opening for the flow of liquid in one direction and a multiplicity of tubes extending through the steam belt for the flow of the liquid in the opposite direction, said rotary device serving as a pump to impel the fluid through the steam belt.

ALFRED L. WEBRE.